(12) United States Patent
Morise et al.

(10) Patent No.: US 9,506,443 B2
(45) Date of Patent: Nov. 29, 2016

(54) VEHICLE ENGINE-STARTING DEVICE

(75) Inventors: Masaru Morise, Aichi (JP); Shinji Oita, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 190 days.

(21) Appl. No.: 14/358,429

(22) PCT Filed: Nov. 17, 2011

(86) PCT No.: PCT/JP2011/076586
§ 371 (c)(1),
(2), (4) Date: May 15, 2014

(87) PCT Pub. No.: WO2013/073043
PCT Pub. Date: May 23, 2013

(65) Prior Publication Data
US 2014/0323269 A1    Oct. 30, 2014

(51) Int. Cl.
*F02N 11/00* (2006.01)
*F16H 63/34* (2006.01)
*F16H 61/00* (2006.01)
*F02N 15/06* (2006.01)

(52) U.S. Cl.
CPC ............. *F02N 11/00* (2013.01); *F02N 11/003* (2013.01); *F16H 61/0025* (2013.01); *F16H 61/0031* (2013.01); *F16H 63/3458* (2013.01); *B60Y 2300/63* (2013.01); *F02N 15/067* (2013.01); *Y10T 477/656* (2015.01)

(58) Field of Classification Search
CPC  B60K 17/34; B60K 17/346; B60K 17/3462; B60K 17/348
See application file for complete search history.

(56) References Cited

U.S. PATENT DOCUMENTS

| 4,481,424 A * | 11/1984 | Hattori | F02N 11/00 123/179.22 |
|---|---|---|---|
| 2010/0312424 A1 | 12/2010 | Yasui | |
| 2016/0138549 A1* | 5/2016 | Kuniyoshi | F02N 11/0862 290/38 R |

FOREIGN PATENT DOCUMENTS

| EP | 0 109 246 | 5/1984 |
|---|---|---|
| JP | 59-71962 | 5/1984 |
| JP | 2002-122236 | 4/2002 |
| JP | 2004-169877 | 6/2004 |
| JP | 2011-12804 | 1/2011 |

* cited by examiner

*Primary Examiner* — Derek D Knight
(74) *Attorney, Agent, or Firm* — Finnegan, Henderson, Farabow, Garrett & Dunner, LLP

(57) ABSTRACT

An engine-starting device for a vehicle having an engine, a parking lock mechanism and an automatic transmission, the engine-starting device being provided with a drive plate connected to a crankshaft of said engine, an electric motor having a pinion selectively engageable with the drive plate, and an actuator device configured to move said pinion to an engaging position for engagement with said drive plate to start said engine, comprises: said parking lock mechanism having a manual shaft selectively switchable between a rotation permitting position for permitting a rotary motion of an output shaft of said automatic transmission, and a parking lock position for inhibiting the rotary motion of the output shaft; and said actuator device being configured to move said pinion between said engaging position and a non-engaging position for disengagement from said drive plate, said electric motor being connected to said manual shaft to rotate the manual shaft from one of said rotation permitting position and said parking lock position to the other, when said pinion is located at said non-engaging position by said actuator device.

6 Claims, 7 Drawing Sheets

VEHICLE ENGINE-STARTING DEVICE

CROSS-REFERENCE TO RELATED APPLICATIONS

This application is a national phase application of International Application No. PCT/JP2011/076586, filed Nov. 17, 2011, the content of which is incorporated herein by reference.

TECHNICAL FIELD

The present invention relates to a vehicular engine-starting device, and more particularly to techniques for reducing the number of electric motors disposed within an engine room, by utilizing at least one of an electric motor of a parking lock mechanism and an electric motor of an oil pump, as an electric motor of a vehicular engine-starting device.

BACKGROUND ART

One type of the vehicular engine-starting device is provided with (a) a drive plate connected to a crankshaft of an engine, (b) an electric motor having a pinion selectively engageable with the drive plate, and (c) an actuator device configured to move the pinion to an engaging position for engagement with the above-described drive plate, for starting the above-described engine.

By the way, an engine room in which the above-described vehicular engine-starting device is disposed accommodates a parking lock mechanism having a manual shaft selectively switchable between a rotation permitting position for permitting a rotary motion of an output shaft of a transmission, and a parking lock position for inhibiting the rotary motion of the output shaft, as disclosed in Patent Document 1, and an oil pump to deliver a working oil used by the transmission. In this respect, it is noted that the above-described parking lock mechanism is provided with a parking lock electric motor for operating the above-described manual shaft from one of the above-indicated rotation permitting position and the above-indicated parking lock position to another, while the above-described oil pump is provided with an oil pump driving electric motor for operating the oil pump.

PRIOR ART DOCUMENT

Patent Document

Patent Document 1: JP-2011-12804 A1

SUMMARY OF THE INVENTION

Object Achieved by the Invention

However, an electric motor of the vehicular engine-starting device arranged as described above is used only when the engine is started, but is not utilized for another purpose, for example, as the parking lock electric motor or the oil pump driving electric motor, so that the weight of the vehicle is increased, and the number of the electric motors disposed within the engine room is increased, leading to a problem of reduction of a space available within the engine room.

The present invention was made in view of the background art described above. It is therefore an object of the present invention to provide a vehicular engine-starting device which permits the utilization of an electric motor provided for another purpose, to reduce the number of the electric motors disposed within the engine room.

Means for Achieving the Object

The object indicated above is achieved according to a first aspect of the present invention, which provides an engine-starting device for a vehicle, (a) which is provided with a drive plate connected to a crankshaft of an engine, an electric motor having a pinion selectively engageable with the drive plate, and an actuator device configured to move the pinion to an engaging position for engagement with the above-described drive plate to start the above-described engine, characterized by comprising (b) a parking lock mechanism having a manual shaft selectively switchable between a rotation permitting position for permitting a rotary motion of an output shaft of an automatic transmission, and a parking lock position for inhibiting the rotary motion of the output shaft, and (c) the above-described electric motor being connected to the above-described manual shaft to rotate the manual shaft from one of the above-described rotation permitting position and the above-described parking lock position to the other, when the above-described pinion is located at a non-engaging position by the above-described actuator device.

Advantages of the Invention

In the vehicular engine-starting device according to the above-described first aspect of this invention, the above-described actuator device is configured to move the above-described pinion to the above-described engaging position to start said engine so that the above-described engine is started by the above-described electric motor. When the above-described pinion is located at the non-engaging position by the above-described actuator device, the above-described manual shaft is rotated by the above-described electric motor from one of the above-described rotation permitting position and the above-described parking lock position to the other. Thus, the same electric motor is used as a drive power source for the above-described vehicular engine-starting device and the above-described parking lock mechanism, for selectively implementing an operation to start the above-described engine, and an operation to switch the above-described manual shaft from one of the above-described rotation permitting position and the above-described parking lock position to the other. Accordingly, the number of the electric motors disposed within an engine room can be reduced, so that the weight of the vehicle is reduced, and the space available within the engine room is increased.

According to one preferred form of the first aspect of this invention, (a) the above-described pinion is axially movable relative to an output member of the above-described electric motor, and is moved by the above-described actuator device from the above-described non-engaging position to the above-described engaging position, and (b) the above-described electric motor is provided with a rotor shaft to operate the above-described output member, and the above-described pinion is moved by the above-described actuator device to the above-described non-engaging position, the rotor shaft being connected to the above-described manual shaft through a speed reducer. Thus, the same electric motor is used as the drive power source for the above-described vehicular engine-starting device and the above-described parking lock mechanism, for selectively implementing the operation to start the above-described engine, and the operation to switch the above-described manual shaft from one of the above-described rotation permitting position and the above-described parking lock position to the other. Accordingly, the number of the electric motors disposed within an engine room can be reduced, so that the weight of the vehicle is reduced, and the space available within the engine room is increased.

According to another preferred form of the first aspect of the invention, (a) a second pinion meshing with an input gear of the above-described speed reducer is provided at an axial end portion of the above-described rotor shaft such that the second pinion is not rotatable relative to the rotor shaft and is axially movable relative to the rotor shaft, and (b) the above-described actuator device being operated to move the second pinion to a non-engaging position for disengagement from the above-described input gear when the above-described engine is started, and to an engaging position for engagement with the input gear when a switching operation of the above-described parking lock mechanism is performed. Thus, the same electric motor is used as the drive power source for the above-described vehicular engine-starting device and the above-described parking lock mechanism, for selectively implementing the operation to start the above-described engine, and the operation to switch the above-described manual shaft from one of the above-described rotation permitting position and the above-described parking lock position to the other. Accordingly, the number of the electric motors disposed within an engine room can be reduced, so that the weight of the vehicle is reduced, and the space available within the engine room is increased. In addition, the above-described actuator device is configured to be operated to move the above-described second pinion to the above-indicated non-engaging position for disengagement from the above-described input gear, and to move the above-described pinion to the above-indicated non-engaging position for disengagement from the above-described drive plate. That is, when the above-described manual shaft has a failure of switching from one of the above-indicated rotation permitting position and the above-indicated parking lock position to the other, due to some defect, the above-described actuator device is operated to move the above-described second pinion to the above-indicated non-engaging position and to move the above-described pinion to the above-indicated non-engaging position, so that the above-described manual shaft can be manually switched by an appropriate lever, from one of the above-indicated rotation permitting and parking lock positions to the other. Accordingly, even in the event of the failure of switching of the above-described manual shaft from one of the above-indicated rotation permitting and parking lock positions to the other, the vehicle can be moved or parked, whereby it is possible to improve a degree of freedom to deal with the defect.

According to a further preferred form of the first aspect of the invention, (a) the vehicle includes an oil pump configured to deliver a working oil used by the above-described transmission, and (b) the oil pump has an input shaft connected to an output member or a rotor shaft of the above-described electric motor, and is operated by the output member or the rotor shaft. Thus, the same electric motor is used as a drive power source for the above-described vehicular engine-starting device and the above-described parking lock mechanism, for selectively implementing an operation to start the above-described engine, and an operation to switch the above-described manual shaft from one of the above-described rotation permitting position and the above-described parking lock position to the other. Accordingly, the number of the electric motors disposed within the engine room can be reduced, so that the weight of the vehicle is reduced, and the space available within the engine room is increased. Further, the same electric motor is used as a drive power source for the above-described vehicular engine-starting device, the above-described parking lock mechanism and the above-described oil pump, so that the number of the electric motors disposed within the engine room is further reduced.

The object indicated above is also achieved according to a second aspect of the present invention, which provides an engine-starting device for a vehicle, (a) which is provided with a drive plate connected to a crankshaft of an engine, an electric motor having an output member provided in one end portion thereof with a pinion selectively engageable with the drive plate, and an actuator device configured to move the pinion to an engaging position for engagement with the above-described drive plate to start the above-described engine, characterized by comprising (b) an oil pump configured to deliver a working oil used by an automatic transmission, and (c) the oil pump having an input shaft which is connected to the above-described electric motor and which is rotated by the electric motor.

In the vehicular engine-starting device according to the second aspect of the invention, (b) the oil pump is configured to deliver the working oil used by the automatic transmission, and (c) the oil pump has the input shaft which is connected to the above-described electric motor and which is rotated by the electric motor. When the above-described engine is started by the above-described electric motor, the actuator device is operated to move the above-described pinion to the above-described engaging position. Further, the input shaft of the above-described oil pump is rotated by the above-described electric motor, irrespective of the movement of the above-described pinion by the above-described actuator device. The operation of the above-described oil pump irrespective of the movement of the above-described pinion by the above-described actuator device does not cause a problem, and the above-described pinion is moved by the above-described actuator device to the above-indicated engaging position to start the engine. Thus, the same electric motor is used as a common drive power source for the above-described vehicular engine-starting device and the above-described oil pump, so that the number of the electric motors disposed within the engine room is reduced.

MODE FOR CARRYING OUT THE INVENTION

Figure 1:
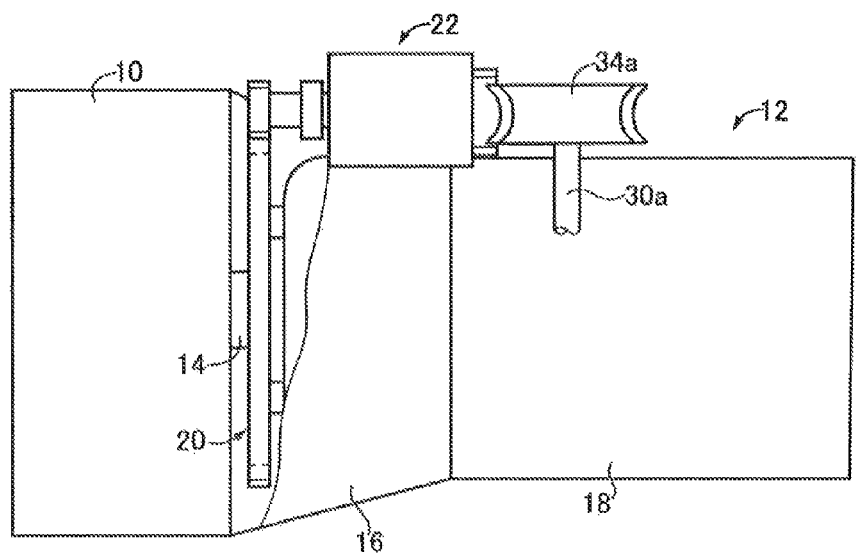
FIG. 1 is a schematic view showing an engine provided on a vehicle provided with a vehicular engine-starting device according to one embodiment of this invention, and a power transmitting system for transmitting a drive force of the engine to a pair of drive wheels.

Referring to the drawings, embodiments of the present invention will be described in detail. It is to be understood that the drawings are simplified or transformed as needed for easy understanding, and do not necessarily accurately represent the dimensions and shapes of various elements of the embodiments.

First Embodiment

FIG. 1 is the schematic view showing an engine 10 provided on a vehicle to which the present invention is applicable, and a power transmitting system 12 for transmitting a drive force of the engine 10 to a pair of drive wheels not shown. An output of the engine 10 which is an internal combustion engine provided as a vehicle drive power source is transmitted to the pair of drive wheels through a crankshaft 14 of the engine 10, a torque converter 16, an automatic transmission 18 and a differential gear device.

Figure 2:
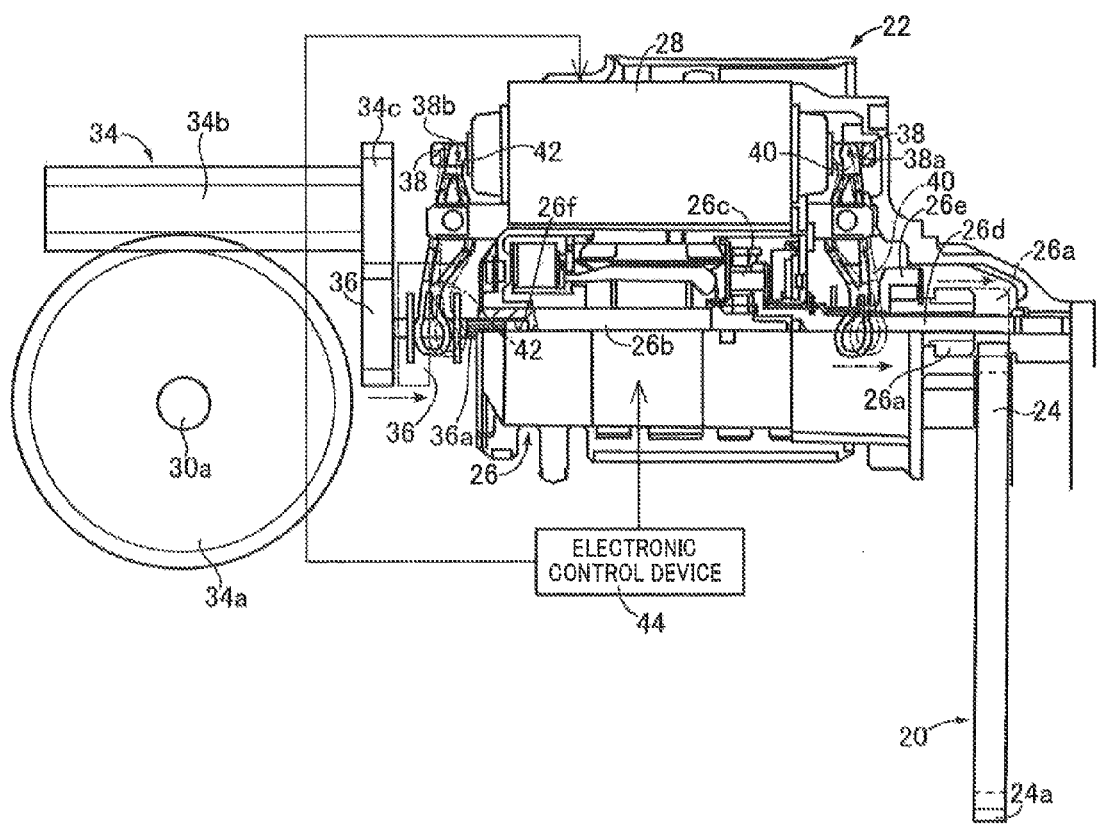
FIG. 2 is an enlarged view of the vehicular engine-starting device of FIG. 1.

The power transmitting system 12 is provided with an engine starting device 22 configured to start the engine 10, namely, to raise an operating speed of the engine 10 to a value at which the engine 10 is operable by itself. As shown in FIG. 2, this engine starting device 22 is provided with a drive plate 20, a starter motor (electric motor) 26, and an actuator device 28 of a magnet (electromagnet) type. The drive plate 20 is provided with an annular starter ring gear 24 fixed to its outer circumference and having external teeth 24a. The starter motor 26 has a first pinion 26a selectively engageable with the external teeth 24a of the starter ring gear 24 of the drive plate 20. To start the engine 10, the actuator device 28 is operated to move the first pinion 26a to an engaging position for engagement with the external teeth 24a of the starter ring gear 24 fixed to an outer circumferential surface of the drive plate 20.

As shown in FIG. 2, the starter motor 26 is provided with a rotor shaft 26b for rotatably supporting its rotor, and an output member 26d disposed coaxially with the rotor shaft 26b and connected to the rotor shaft 26b via a speed reducer 26c such that the output member 26d is axially movable relative to the rotor shaft 26b. The first pinion 26a is disposed axially movably relatively to the output member 26d of the starter motor 26, and connected to the output member 26d through a one-way clutch 26e. It is noted that the one-way clutch 26e and the output member 26d are connected to each other such that the one-way clutch 26e and the output member 26d are not rotatable relative to each other and are with respect to a rotational axis of the output member 26d movable relative to each other.

Figure 3:
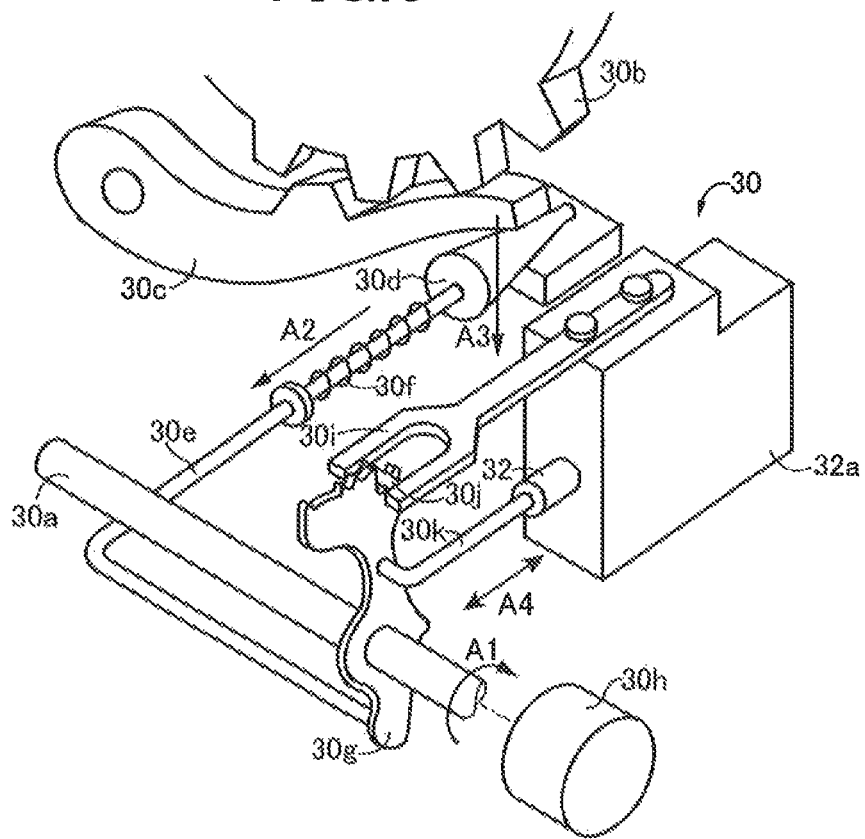
FIG. 3 is a view for explaining a parking lock mechanism provided in the vehicular engine-starting device of FIG. 2.

FIG. 3 is the view for explaining a parking lock mechanism 30 having a manual shaft 30a selectively switchable between a rotation permitting position for permitting a rotary motion of an output shaft of the automatic transmission 18, and a parking lock position for inhibiting the rotary motion of the output shaft of the automatic transmission 18.

As shown in FIG. 3, the parking lock mechanism 30 is provided with a parking lock pawl 30c, a parking rod 30e, a spring 30f, a detent plate 30g, the manual shaft 30a, a rotary encoder 30h, a spring 30i in the form of a sheet, and an engaging portion 30j. The parking lock pawl 30c is disposed pivotably to an engaging position for engagement with a parking lock gear 30b fixed to the output shaft of the automatic transmission 18, to selectively lock the parking lock gear 30b. The parking rod 30e is fixed at its end to one end of a tapered member 30d which is held in engagement with a distal end portion of the parking lock pawl 30c. The spring 30f is provided on the parking rod 30e to bias the tapered member 30d toward its smaller-diameter end. The detent plate 30g is supported by the manual shaft 30a rotatably together with the manual shaft 30a, and is fixed to the other end of the parking rod 30e in a rotatable manner. The detent plate 30g has at least a parking lock position that can be maintained by a spring mechanism. The manual shaft 30a is fixed to the detent plate 30g, and is supported rotatably with respect to an axis. The rotary encoder 30h is connected to the manual shaft 30a to detect an angular position of the manual shaft 30a. The spring 30i is provided to hold the detent plate 30g in a selected one of predetermined shift positions P, R, N and D, under a biasing action. The engaging portion 30j is provided in an end portion of the spring 30i. As also shown in FIG. 3, a connecting member 30k is fixed to the detent plate 30g, so as to connect the detent plate 30g and a manual valve 32 of the automatic transmission 18 to each other. The manual valve 32 is movable bidirectionally (in opposite directions indicated by arrows A4 in FIG. 3) within a valve body 32a, so that a hydraulic circuit is switched to establish the selected shift position of the automatic transmission 18.

As shown in FIG. 2, the parking lock mechanism 30 is provided with a speed reducer 34 having a worm wheel 34a fixed to one end portion of the manual shaft 30a, and a worm gear 34b engaging the worm wheel 34a, and is further provided with a second pinion 36 engaging an input gear 34c fixed to the worm gear 34b. The second pinion 36 is provided with a shaft portion 36a extending therefrom toward the rotor shaft 26b of the starter motor 26. The shaft portion 36a of the second pinion 36 is fitted in a fitting hole 26f formed in an end portion of the rotor shaft 26b on a side of the second pinion 36, such that the shaft portion 36a is not rotatable relative to the rotor shaft 26b and is axially movable relative to the rotor shaft 26b.

In the parking lock mechanism 30 constructed as described above, the second pinion 36 is moved by the actuator device 28 to an engaging position for engagement with the input gear 34c of the speed reducer 34, so that when the rotor shaft 26b is rotated by the starter motor 26, a drive force of the rotor shaft 26b is transmitted to the manual shaft 30a through the second pinion 36 and the speed reducer 34, to rotate the manual shaft 30a to be rotated from one of the above-indicated rotation permitting position and the above-indicated parking lock position to the other, and to rotate the detent plate 30g for moving the manual valve 32 in the direction indicated by the arrows A4.

When the manual shaft 30a is rotated in a direction indicated by an arrow A1 in FIG. 3, from its parking lock position of FIG. 3 for the parking lock gear 30b to lock the parking lock pawl 30c, the tapered member 30d fixed to one end portion of the parking rod 30e is moved in a direction indicated by an arrow A2, so that the parking lock pawl 30c is pivoted downwardly in a direction indicated by an arrow A3, to its rotation permitting position for permitting a rotary motion of the output shaft of the automatic transmission 18. In the present embodiment, the above-indicated parking lock position is selected to establish the shift position P, and the above-indicated rotation permitting position is selected to establish the shift positions R, N and D, that is non-P positions.

As shown in FIG. 2, the actuator device 28 is provided with a switching member 38 having opposite end portions extending from the both ends of the actuator device 28. The actuator device 28 is further provided with a first lever 40 one end portion of which is inserted in a fitting hole 38a formed in one end portion of the switching member 38 on a side of the first pinion 26a and the other end portion of which is connected to the one-way clutch 26e, and a second lever 42 one end portion of which is inserted in a fitting hole 38b formed in the other end portion of the switching member 38 on the side of the second pinion 36 and the other end portion of which is connected to the shaft portion 36a of the second pinion 36.

Accordingly, a movement of the switching member 38 of the actuator device 28 in a direction toward the drive plate 20 causes the first lever 40 and the second lever 42 to bring the first pinion 26a to its non-engaging position for disengagement from the starter ring gear 24, and to bring the second pinion 36 to its engaging position for engagement with the input gear 34c. Namely, the first pinion 26a and the second pinion 36 are moved to the positions indicated by solid lines in FIG. 2. On the other hand, a movement of the switching member 38 of the actuator device 28 in a direction away from the drive plate 20 causes the first lever 40 and the second lever 42 to bring the first pinion 26a to its engaging position for engagement with the starter ring gear 24, and to bring the second pinion 36 to its non-engaging position for disengagement from the input gear 34c. Namely, the first pinion 26a and the second pinion 36 are moved to the positions indicated by one-dot chain lines in FIG. 2.

Figure 4:
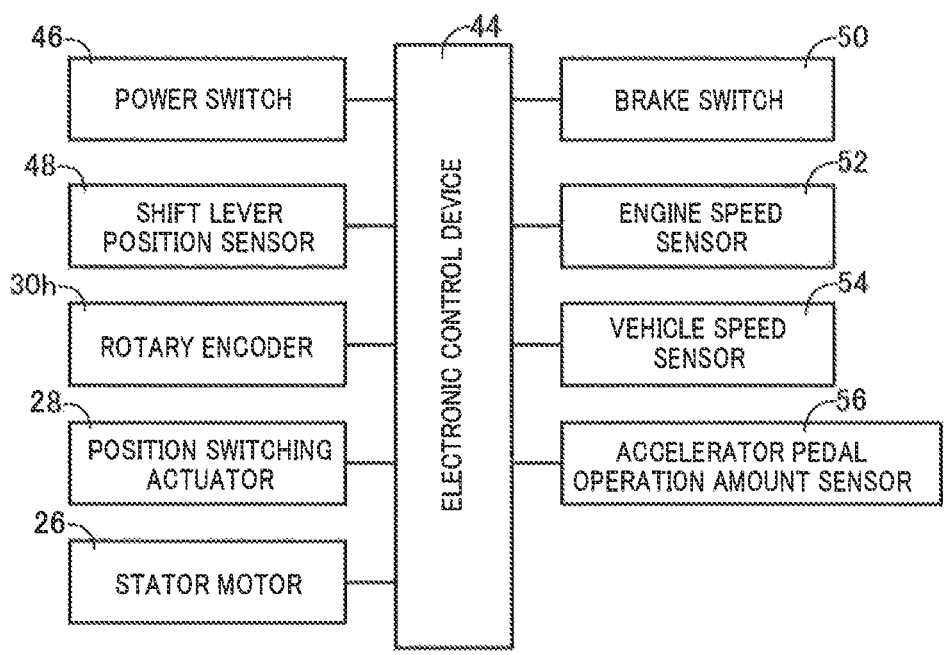
FIG. 4 is a view for explaining input signals received by an electronic control device for controlling an actuator device and a starter motor provided in the vehicular engine-starting device of FIG. 2, and output signals generated from the electronic control device.

FIG. 4 is the view for explaining input signals received by an electronic control device 44 for controlling the starter motor 26 and actuator device 28 of the engine-starting device 22, and output signals generated from the electronic control device 44. This electronic control device 44 includes a so-called microcomputer incorporating a CPU, a ROM, a RAM and an input-output interface, and the CPU performs signal processing operations according to programs stored in the ROM while utilizing a temporary data storage function of the RAM, to implement various controls such as a rotation control of the rotor shaft 26b of the starter motor 26 and a switching control of the switching member 38 of the actuator device 28.

As shown in FIG. 4, the electronic control device 44 is configured to receive input signals such as an output signal of a power switch 46, an output signal of a shift lever position sensor 48 indicative of the selected operating position of the shift lever of a manual shifting device operated by a vehicle operator, an output signal of the rotary encoder 30h indicative of the angular movement amount of the manual shaft 30a, an output signal of a brake switch 50 indicating whether a brake pedal is in an operated or non-operated state, an output signal of an engine speed sensor 52 indicative of the operating speed of the engine 10, an output signal of a vehicle speed sensor 54 indicative of the vehicle running speed, and an output signal of an accelerator pedal operation amount sensor 56 indicative of an amount or angle of operation of an accelerator pedal. At the same time, the electronic control device 44 is configured to generate output signals such as a drive signal for operating the starter motor 26 to rotate the rotor shaft 26b, and a drive signal for operating the actuator device 28 to move the switching member 38.

Figure 5:
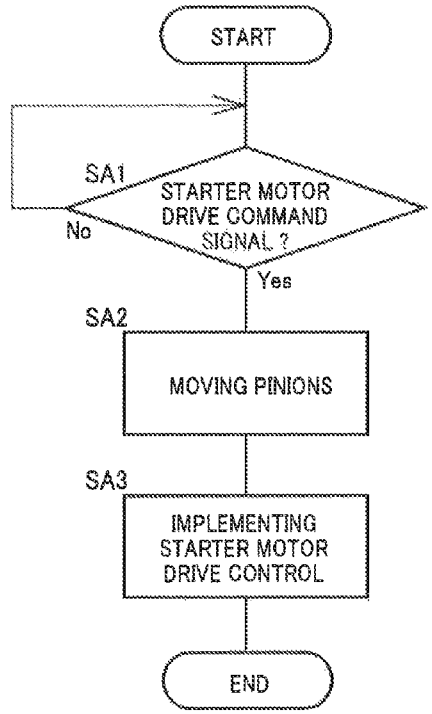
FIG. 5 is a flow chart illustrating an engine starting control for determining whether the vehicular engine-starting device of FIG. 2 is required to start the engine, and for commanding the vehicular engine-starting device to start the engine.

FIG. 5 is the flow chart illustrating an engine starting control for determining whether the engine-starting device 22 is required to start the engine 10, and for commanding the engine-starting device 22 to start the engine 10.

The engine starting control is initiated with step SA1 (hereinafter "step" being omitted) to determine whether the starter motor 26 of the engine-starting device 22 is required to be operated. This determination is made by determining whether a starting motor drive command signal has been generated or not. In an idling stop mode in which the engine 10 is at rest, for instance, the starter motor 26 is operated when the following conditions are satisfied. These conditions consist of: a condition that the vehicle is stationary, that is, the vehicle running speed is zero; a condition that the shift position D is selected; a condition that the brake pedal is in an operated state while the accelerator pedal is in the non-operated state. SA1 is repeatedly implemented until the starting motor drive command signal has been generated. If an affirmative determination is obtained in SA1, the control flow goes to SA2 to operate the actuator device 28 to move the first pinion 26a to the engaging position for engagement with the starter ring gear 24, and to move the second pinion 36 to the non-engaging position for disengagement from the input gear 34c, so that the first pinion 26a is brought into engagement with the starter ring gear 24 while the second pinion 36 is disengaged from the input gear 34c.

Then, the control flow goes to SA3 to operate the starting motor 26 for rotating the rotor shaft 26b to rotate the crankshaft 14 of the engine 10 through the first pinion 26a. The starter motor 26 is operated to raise the operating speed of the engine 10 to a predetermined value above which the engine 10 can be held operated by itself. After the operating speed of the engine 10 has been raised above the predetermined value, the starter motor 26 is turned off, and the actuator device 28 is operated to move the first pinion 26a to the non-engaging position for disengagement from the starter ring gear 24, and to move the second pinion 36 to the engaging position for engagement with the input gear 34c, and the flow chart is terminated.

Figure 6:
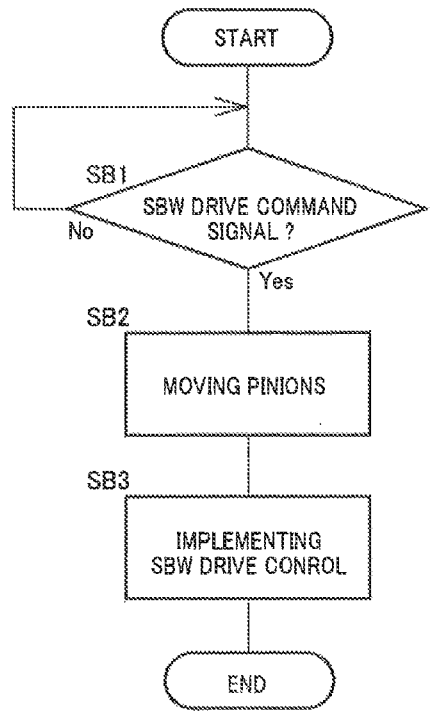
FIG. 6 is a flow chart illustrating a shift position switching control for determining whether a shift lever of a manual shifting device has been operated by a vehicle operator, and for operating a manual shaft to shift an automatic transmission to a shift position according to an operating position of the shift lever selected by the vehicle operator.

FIG. 6 is the flow chart illustrating a shift position switching control implemented upon an operation of the shift lever of the manual shifting device by the vehicle operator, for operating the starter motor 26 to move the manual shaft 30a of the parking lock mechanism 30 to shift the automatic transmission 18 to the shift position according to the operating position of the shift lever selected by the vehicle operator.

The shift position switching control is initiated with SB1 to determine whether the manual shaft 30a of the parking lock mechanism 30 is required to be operated. This determination is made by determining whether an SBW drive command signal has been generated or not. The manual shaft 30a is operated when the following condition is satisfied. This condition is satisfied if the shift position of the automatic transmission 18 established by the parking lock mechanism 30 is inconsistent with the operating position of the shift lever selected by the vehicle operator while the engine starting operation is not performed. SB1 is repeatedly implemented until the SBW drive command signal has been generated. If an affirmative determination is obtained in SB1, the control flow goes to SB2 to operate the actuator device 28 to move the first pinion 26a to the non-engaging position for disengagement from the starter ring gear 24, and to move the second pinion 36 to the engaging position for engagement with the input gear 34c, so that the first pinion 26a is disengaged from the starter ring gear 24 while the second pinion 36 is brought into engagement with the input gear 34c.

Then, the control flow goes to SB3 to operate the starter motor 26 so that the rotor shaft 26b rotates the manual shaft 30a through the second pinion 36 until the automatic transmission 18 has been shifted to the shift position consistent with the operating position of the shift lever selected by the vehicle operator. When the automatic transmission 18 has been shifted to the shift position consistent with the operating position selected by the vehicle operator, the starter motor 26 is turned off, and the present shift position switching control is terminated.

The engine-starting device 22 according to the present embodiment is configured such that when the first pinion 26a is located at the non-engaging position by the actuator device 28, the starter motor 26 is connected to the manual shaft 30a of the parking lock mechanism 30, so that the manual shaft 30a is rotated by the starter motor 26 from one of the above-described rotation permitting position and the above-described parking lock position to the other. Further, the actuator device 28 is operated to move the first pinion 26a to the above-described engaging position to start said engine so that the engine 10 is started by the starter motor 26. Thus, the same starter motor 26 is used as a drive power source for the engine-starting device 22 and the parking lock mechanism 30, for selectively implementing an operation to start the engine 10, and an operation to switch the manual shaft 30a from one of the above-described rotation permitting position and the above-described parking lock position to the other. Accordingly, the number of the electric motors disposed within the engine room can be reduced, so that a weight of the vehicle is reduced, and the space available within the engine room is increased.

The engine-starting device 22 according to the present embodiment is further configured such that the first pinion 26a is axially movable relative to the output member 26d of the starter motor 26, and is moved by the actuator device 28 from the non-engaging position for disengagement from the starter ring gear 24 to the engaging position for engagement with the starter ring gear 24, and the starter motor 26 is provided with the rotor shaft 26b to operate the output member 26d, and the first pinion 26a is moved by the actuator device 28 to the above-described non-engaging position. The rotor shaft 26b is connected to the manual shaft 30a through the speed reducer 34. Thus, the same starter motor 26 is used as the drive power source for the engine-starting device 22 and the parking lock mechanism 30, for selectively implementing the operation to start the engine 10, and the operation to switch the above-described manual shaft 30a from one of the above-described rotation permitting position and the above-described parking lock position to the other. Accordingly, the number of the electric motors disposed within the engine room can be reduced, so that the weight of the vehicle is reduced, and the space available within the engine room is increased.

Second Embodiment

Other embodiments of this invention will be described. It is to be understood that the same reference signs will be used to identify the corresponding elements in the different embodiments, which will not be described redundantly.

An engine-starting device 58 according to the present embodiment is different from the engine-starting device 22 according to the above-described first embodiment, in that the engine-starting device 58 is provided with an actuator device 60 different from the actuator device 28 of the first embodiment. In the other aspects, the engine-starting device 58 is substantially identical in construction with the engine-starting device 22.

Figure 7:
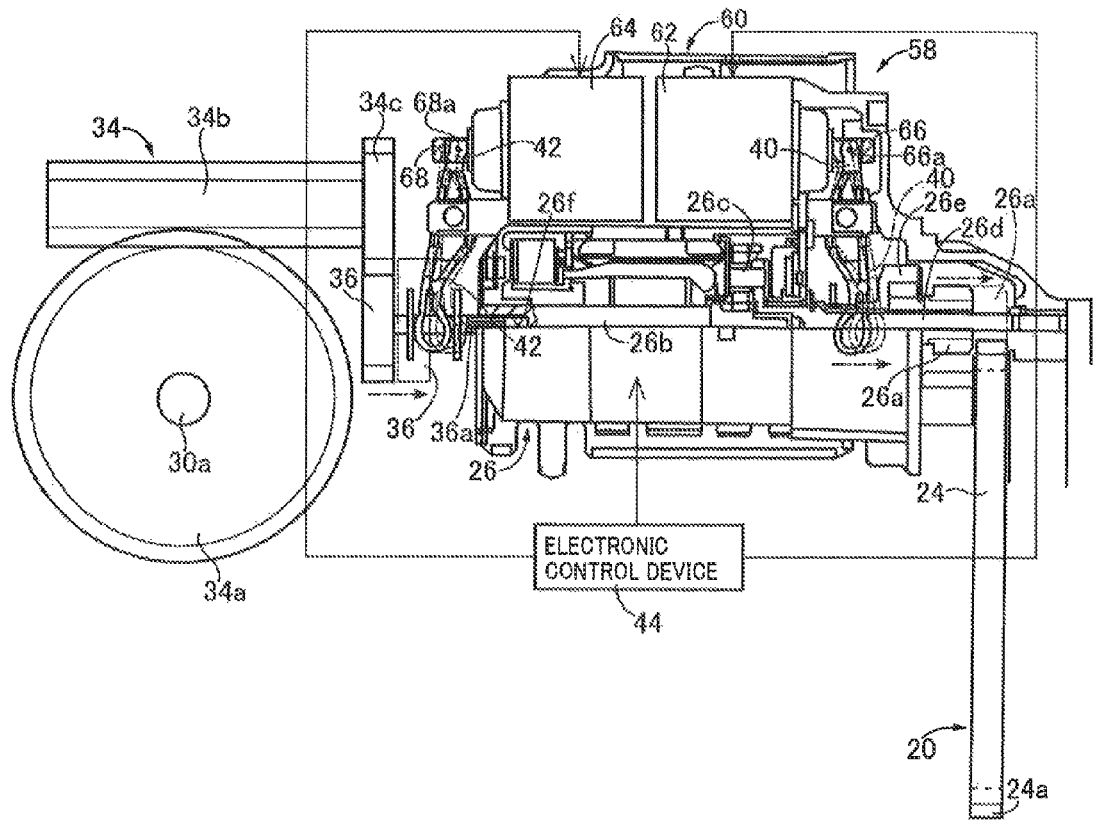
FIG. 7 is a view corresponding to that of FIG. 2, showing a vehicular engine-starting device according to another embodiment of this invention.

As shown in FIG. 7, the actuator device 60 consists of a first switching device 62 configured to move the first pinion 26a between the engaging position for engagement with the starter ring gear 24 and the non-engaging position for disengagement from the starter ring gear 24, and a second switching device 64 configured to move the second pinion 36 between the engaging position for engagement with the input gear 34c and the non-engaging position for disengagement from the input gear 34c.

As shown in FIG. 7, the first switching device 62 is provided with a first switching member 66 extending from its end portion on a side of the starter ring gear 24, and the first lever 40 one end portion of which is fitted in a fitting hole 66a formed in the first switching member 66 and the other end portion of which is connected to the one-way clutch 26e as in the first embodiment. Further, the second switching device 64 is provided with a second switching member 68 extending from its end portion on a side of the input gear 34c, and the second lever 42 one end portion of which is fitted in a fitting hole 68a formed in the second switching member 68 and the other end portion of which is connected to the shaft portion 36a of the second pinion 36 as in the first embodiment.

When the first switching member 66 is moved by the first switching device 62 in a direction toward the starter ring gear 24, therefore, the first pinion 26a is moved by the first lever 40 to the non-engaging position for disengagement from the starter ring gear 24, namely, the first pinion 26a is moved to the position indicated by solid lines in FIG. 7. When the first switching member 66 is moved by the first switching device 62 in a direction away from the starter ring gear 24, on the other hand, the first pinion 26a is moved by the first lever 40 to the engaging position for engagement with the starter ring gear 24, namely, the first pinion 26a is moved to the position indicated by one-dot chain lines in FIG. 7.

Further, when the second switching member 68 is moved by the second switching device 64 in a direction toward the input gear 34c, the second pinion 36 is moved by the second lever 42 to the non-engaging position for disengagement from the input gear 34c, namely, the second pinion 36 is moved to the position indicated by one-dot chain lines in FIG. 7. When the second switching member 68 is moved by the second switching device 64 in a direction away from the input gear 34c, on the other hand, the second pinion 36 is moved by the second lever 42 to the engaging position for engagement with the input gear 34c, namely, the second pinion 36 is moved to the position indicated by solid lines in FIG. 7.

Figure 8:
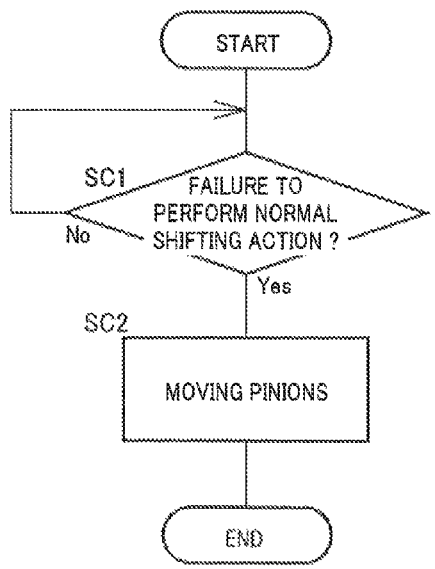
FIG. 8 is a flow chart illustrating a control operation of the actuator device in the event of a failure of the automatic transmission to perform a normal shifting action due to some defect when the shift lever of the manual shifting device is operated by the vehicle operator while the engine is in operation.

In the present second embodiment, an engine starting control and a shift position switching control as illustrated in FIGS. 5 and 6 are implemented. However, the second embodiment is different from the first embodiment in that the second embodiment is configured to permit the movement of the first pinion 26a to the non-engaging position for disengagement from the starter ring gear 24, and the movement of the second pinion 36 to the non-engaging position for disengagement from the input gear 34c. FIG. 8 illustrates a control operation relating to this difference.

FIG. 8 is the flow chart illustrating a control operation of the actuator device 60 in the event of a failure of the automatic transmission 18 to perform a normal shifting action due to some defect when the shift lever of the manual shifting device is operated by the vehicle operator while the engine 10 is in operation;

The control operation is initiated with SC1 to determine whether the automatic transmission has a failure to perform a normal shifting action. An affirmative determination is obtained in SC1 if the established shift position of the automatic transmission 18 is held inconsistent with the operating position of the shift lever selected by the vehicle operator, for more than a predetermined length of time, due to a failure of switching of the manual shaft 30a from one of the above-indicated rotation permitting position and the above-indicated parking lock position to the other, which failure is caused by some defect. SC1 is repeatedly implemented until the affirmative determination is obtained. If the affirmative determination is obtained in SC1, the control flow goes to SC2 in which the first pinion 26a is moved by the first switching device 62 of the actuator device 60 to the non-engaging position for disengagement from the starter ring gear 24, while the second pinion 36 is moved by the second switching device 64 of the actuator device 60 to the non-engaging position for disengagement from the input gear 34c. The control operation is terminated with SC2.

The engine-starting device 58 according to the present embodiment has substantially the same advantages as the above-described first embodiment. In addition, the engine-starting device 58 has the following advantages. Namely, the actuator device 60 is configured to be operated to move the second pinion 36 to the non-engaging position for disengagement from the input gear 34c, and to move the first pinion 26a to the non-engaging position for disengagement from the starter ring gear 24 fixed to the outer circumferential surface of the drive plate 20. That is, when the manual shaft 30a has a failure of switching from one of the above-indicated rotation permitting position and the above-indicated parking lock position to the other, due to some defect, the actuator device 60 is operated to move the second pinion 36 to the above-indicated non-engaging position and to move the first pinion 26a to the above-indicated non-engaging position, so that the manual shaft 30a can be manually switched by the appropriate lever, from one of the above-indicated rotation permitting and parking lock positions to the other. Accordingly, even in the event of the failure of switching of the manual shaft 30a from one of the above-indicated rotation permitting and parking lock positions to the other, the vehicle can be moved or parked, whereby it is possible to improve a degree of freedom to deal with the defect.

Third Embodiment

An engine-starting device 70 according to the present third embodiment is different from the engine-starting device 58 according to the second embodiment, in that the starter motor 26 is utilized to drive an oil pump 72 to deliver a working oil used by the automatic transmission 18. In the other aspects, the engine-starting device 70 is substantially identical in construction with the engine-starting device 58.

Figure 9:
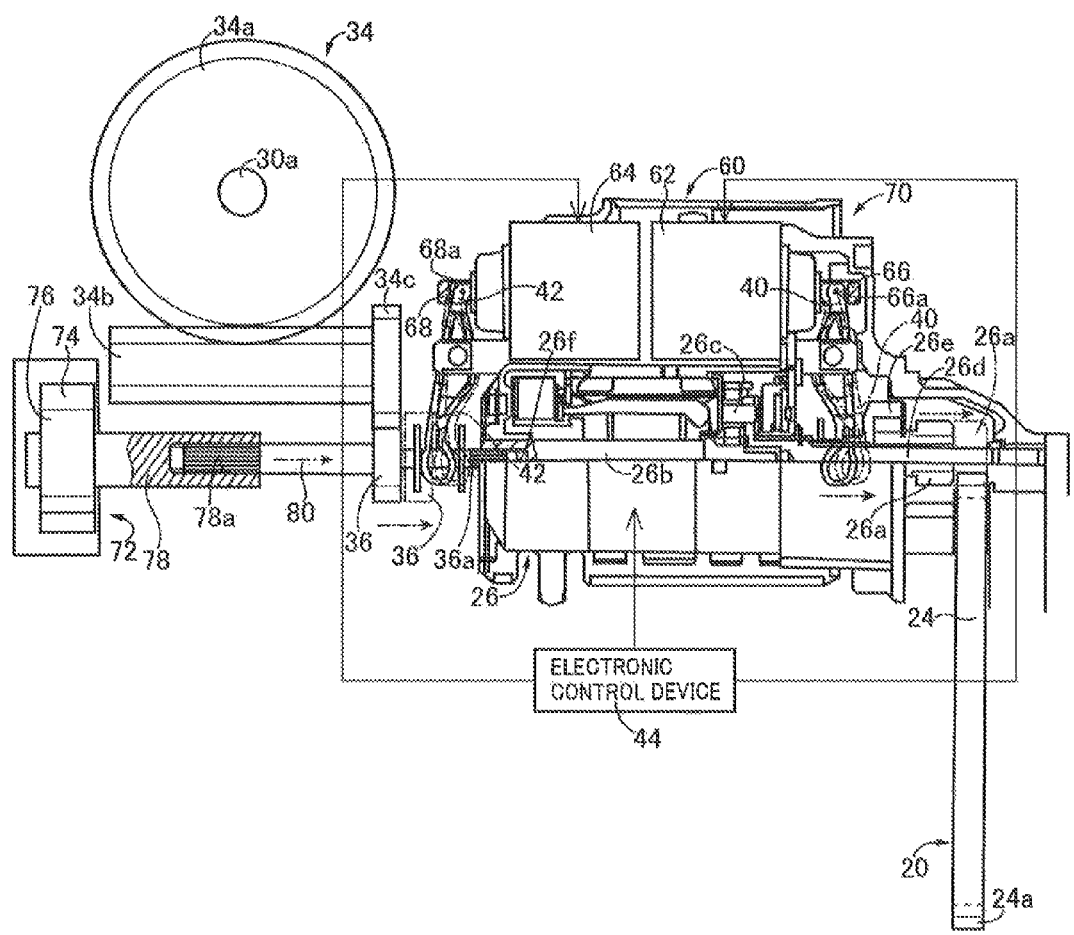
FIG. 9 is a view corresponding to that of FIG. 2, showing a vehicular engine-starting device according to a further embodiment of this invention.

As shown in FIG. 9, the oil pump 72 is an internal-gear type oil pump provided with an annular driven gear 74 disposed rotatably within an oil chamber, and a drive gear 76 which has external teeth meshing with internal teeth of the driven gear 74 and which is rotatably disposed about its axis of rotation eccentric with respect to an axis of rotation of the driven gear 74, to rotate the driven gear 74.

As shown in FIG. 9, the oil pump 72 is provided with an input shaft 78 in the form of a cylinder fixed to the drive gear 76, and a connecting shaft 80 one end portion of which is fitted in a fitting hole 78a formed in one end portion of the input shaft 78 remote from the drive gear 76 and the other end portion of which is fixed to the second pinion 36. As shown in FIG. 9, the fitting hole 78a of the input shaft 78 has internal spline teeth, while the above-indicated one end portion of the connecting shaft 80 has external spline grooves which are held in engagement with the internal spline teeth such that the connecting shaft 80 and the input shaft 78 are not rotatable relative to each other and are movable relative to each other in the axial direction of the input shaft 78. Thus, the input shaft 78 of the oil pump 72 is connected to the rotor shaft 26b of the starter motor 26 through the connecting shaft 80, so that the drive gear 76 of the oil pump 72 is rotated by the starter motor 26, whereby the pressurized working oil is delivered from the oil pump 72.

Figure 10:
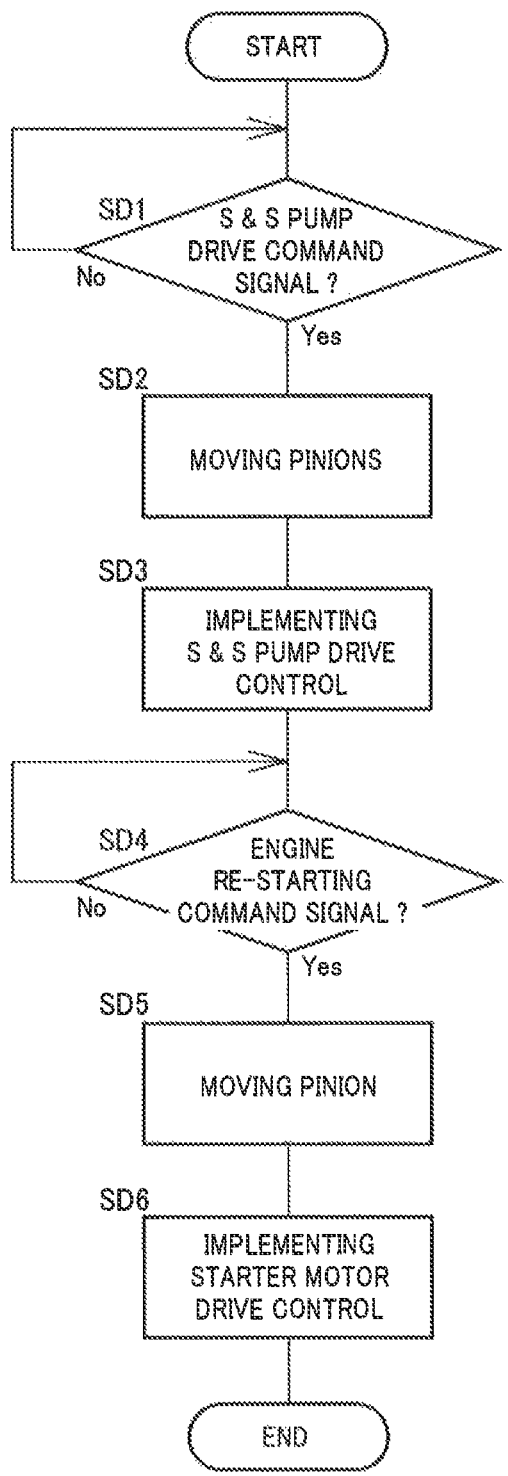
FIG. 10 is a flow chart illustrating an economy running system to once stop the engine when the vehicle is stopped, and to then re-start the engine.

FIG. 10 is the flow chart illustrating an economy running system (hereinafter referred to as "econ-run system") to once stop the engine 10 when the vehicle is stopped, and to then re-start the engine 10.

A control operation of FIG. 10 is initiated with SD1 to determine whether an S & S pump, that is, the oil pump 72 is required to be operated or not, namely, whether the operation of the eco-run system is required to be initiated or not. This determination is made depending upon whether an S & S pump drive command signal has been generated or not. The operation of the eco-run system is initiated if the following conditions are satisfied, for example: a condition that the vehicle is parked with the vehicle running speed being zero; a condition that the shift position D is presently established; a condition that the brake pedal is in an operated state; and a condition that the accelerator pedal is in the non-operated state. SD1 is repeatedly implemented until the condition for initiating eco-run is satisfied. If an affirmative determination is obtained in SD1, the control flow goes to SD2 in which the first pinion 26a is moved by the first switching device 62 of the actuator device 60 to the non-engaging position for disengagement from the starter ring gear 24, so that the first pinion 26a is disengaged from the starter ring gear 24, while the second pinion 36 is moved by the second switching device 64 of the actuator device 60 to the non-engaging position for disengagement from the input gear 34c, so that the second pinon 36 is disengaged from the input gear 34c.

Then, the control flow goes to SD3 in which the oil pump 72 is operated by the starter motor 26 so that a sufficient amount of the working oil is delivered from the oil pump 72 to the automatic transmission 18. The control flow then goes to SD4 to determine whether the engine 10 is required to be re-started or not. The engine 10 is re-started if any one of the conditions for initiating the operation of the eco-run system is not satisfied, for example. Generally, the condition for re-starting the engine 10 is satisfied when the vehicle operator has released the brake pedal, that is, when the brake switch 50 has been turned off. SD4 is repeatedly implemented until the condition for re-starting the engine 10 is satisfied.

If an affirmative determination is obtained in SD4, the control flow goes to SD5 in which the first pinion 26a is moved by the first switching device 62 of the actuator device 60 to the engaging position for engagement with the starter ring gear 24, so that the first pinion 26a is brought into engagement with the starter ring gear 24 while the first pinion 26a is rotated. The control flow then goes to SD6 in which the operating speed of the engine 10 is raised by the starter motor 26 to a predetermined value at which the engine 10 can be operated by itself. When the operating speed of the engine 10 has exceeded the above-indicated predetermined value, the starter motor 26 is turned off, and the first pinion 26a is moved by the first switching device 62 of the actuator device 60 to the non-engaging position for disengagement from the starter ring gear 24. The present control operation is terminated with SD6.

The engine-starting device 70 according to the present embodiment is configured such that the same starter motor 26 is used as a drive power source for the engine-starting device 70 and the parking lock mechanism 30, for selectively implementing an operation to start the engine 10, and an operation to switch the manual shaft 30a from one of the above-described rotation permitting position and the above-described parking lock position to the other. Accordingly, the number of the electric motors disposed within the engine room can be reduced, so that the weight of the vehicle is reduced, and the space available within the engine room is increased. Further, the same starter motor 26 is used as a drive power source for the engine-starting device 70, the parking lock mechanism 30 and the oil pump 72, so that the number of the electric motors disposed within the engine room is further reduced.

Fourth Embodiment

An engine-starting device 82 according to the present fourth embodiment is different from the engine-starting device 70 according to the third embodiment, in that the engine-starting device 82 is not provided with the parking lock mechanism 30, in that the rotor shaft 26b in the engine-starting device 82 is integrally connected to the connecting shaft 80, and in that an actuator device 84 of the engine-starting device 82 is different from the actuator device 60 of the third embodiment. In the other aspects, the engine-starting device 82 is substantially identical in construction with the engine-starting device 70.

Figure 11:
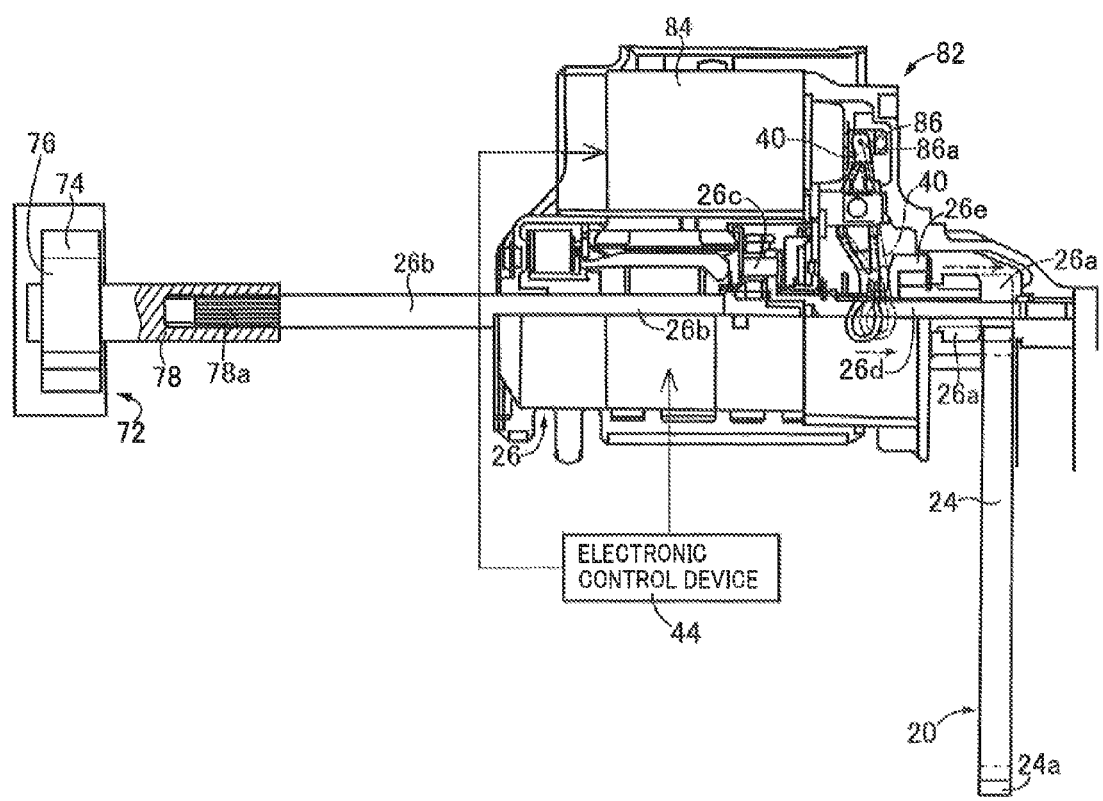
FIG. 11 is a view corresponding to that of FIG. 2, showing a vehicular engine-starting device according to a still further embodiment of this invention.

As shown in FIG. 11, the actuator device 84 is configured to move the first pinion 26a between the engaging position for engagement with the starter ring gear 24 and the non-engaging position for disengagement from the starter ring gear 24. The actuator device 84 is provided with a switching member 86 extending from its end portion on the side of the starter ring gear 24, and the first lever 40 one end portion of which is fitted in a fitting hole 86a formed in the switching member 86 and the other end portion of which is connected to the one-way clutch 26e, as in the first embodiment.

Accordingly, a movement of the switching member 86 by the actuator device 84 in the direction toward the starter ring gear 24 causes the first lever 40 to bring the first pinion 26a to its non-engaging position for disengagement from the starter ring gear 24, that is, to bring the first pinion 26a to the position indicated by solid lines in FIG. 11. On the other hand, a movement of the switching member 86 by the actuator device 84 in the direction away from the starter ring gear 24 causes the first lever 40 to bring the first pinion 26a to its engaging position for engagement with the starter ring gear 24, that is, to bring the first pinion 26a to the position indicated by one-dot chain lines in FIG. 11.

The engine-starting device 82 according to the present embodiment is configured such that the rotor shaft 26b of the starter motor 26 is connected to the input shaft 78 of the oil pump 72 so that the oil pump 72 is operated by the starter motor 26, to deliver the working oil used by the automatic transmission 18. When the engine 10 is started by the starter motor 26, the actuator device 84 is operated to move the first pinion 26a to the engaging position for engagement with the starter ring gear 24. Further, the input shaft 78 of the oil pump 72 is rotated by the starter motor 26, irrespective of the movement of the first pinion 26a by the actuator device 84. The operation of the oil pump 72 irrespective of the movement of the first pinion 26a by the actuator device 84 does not cause a problem, and the first pinion 26a is moved by the actuator device 84 to the above-indicated engaging position to start the engine 10. Thus, the same starter motor 26 is used as a common drive power source for the engine starting-device 82 and the oil pump 72, so that the number of the electric motors disposed within the engine room is reduced.

While the embodiments of this invention have been described in detail by reference to the drawings, it is to be understood that the present invention may be otherwise embodied.

The engine-starting device 22 according to the illustrated embodiment may be modified such that the rotor shaft 26b and the output member 26d are integrally connected to each other, and the first pinion 26a is integrally fixed to the output member 26d, while the second pinion 36 is integrally fixed to the rotor shaft 26b, so that the rotor shaft 26b and the output member 26d integrally connected to each other are moved in the axial direction thereof by the actuator device 28, to move the first pinion 26a and the second pinion 36 between the above-indicated engaging position and the above-indicated non-engaging position. The engine-starting device 22 may be further modified such that the actuator device 28 is operable to move to the switching member 38 three positions, such that the rotor shaft 26b and the output member 26d integrally connected to each other are moved in the axial direction thereof by the actuator device 28 to a first position for engagement of the first pinion 26a with the starter ring gear 24, a second position for engagement of the second pinion 36 with the input gear 34c, and a third position for disengagement of the first pinion 26a from the starter ring gear 24 and disengagement of the second pinion 36 from the input gear 34c. This modification has substantially the same advantages as the engine-starting device 58 according to the second embodiment.

In the engine-starting device 22 according to the illustrated embodiment, the actuator device 28 is of a magnet type configured to move the switching member 38 to the two positions. However, the actuator device 28 may be of any other type such as a cylinder type or a motor type, as long as the actuator device 28 can move the switching device 38 to the two positions.

In the engine-starting devices 70 and 82 according to the illustrated embodiments, the input shaft 78 of the oil pump 72 is connected to the rotor shaft 26b of the starter motor 26. However, the input shaft 78 of the oil pump 72 may be connected to the output member 26d of the starter motor 26.

While the embodiments of this invention have been described for illustrative purpose only, it is to be understood that the invention may be embodied with various changes and improvements which may occur to those skilled in the art.

NOMENCLATURE OF REFERENCE SIGNS

10: Engine
14: Crankshaft
18: Automatic transmission (Transmission)
20: Drive plate
22, 58, 70, 82* Engine starting device (Vehicular engine starting device)
26: Starter motor (Electric motor)
26b: Rotor shaft
26d: Output member
26a: First pinion (Pinion)
28, 60, 84: Actuator device
30: Parking mechanism
30a: Manual shaft
34: Speed reducer
34c: Input gear
36: Second pinion
72: Oil pump
78: Input shaft

The invention claimed is:

1. An engine-starting device for a vehicle having an engine, a parking lock mechanism and an automatic transmission, the engine-starting device being provided with a drive plate connected to a crankshaft of said engine, an electric motor having a pinion selectively engageable with the drive plate, and an actuator device configured to move said pinion to an engaging position for engagement with said drive plate to start said engine, comprising:
said parking lock mechanism having a manual shaft selectively switchable between a rotation permitting position for permitting a rotary motion of an output shaft of said automatic transmission, and a parking lock position for inhibiting the rotary motion of the output shaft; and
said actuator device being configured to move said pinion between said engaging position and a non-engaging position for disengagement from said drive plate, said electric motor being connected to said manual shaft to rotate the manual shaft from one of said rotation permitting position and said parking lock position to the other, when said pinion is located at said non-engaging position by said actuator device.

2. The vehicular engine-starting device according to claim 1, wherein said pinion is axially movable relative to an output member of said electric motor, and is moved by said actuator device from said non-engaging position to said engaging position, and said electric motor is provided with a rotor shaft to operate said output member, and said pinion is moved by said actuator device to said non-engaging position, said rotor shaft being connected to said manual shaft through a speed reducer.

3. The engine-starting device according to claim 2, wherein said parking lock mechanism is provided with a second pinion meshing with an input gear of said speed reducer, and said second pinion is provided at an axial end portion of said rotor shaft such that the second pinion is not rotatable relative to the rotor shaft and is axially movable relative to the rotor shaft,
said actuator device being operated to move said second pinion to a non-engaging position for disengagement from said input gear when said engine is started, and to an engaging position for engagement with said input gear when a switching operation of said parking lock mechanism is performed, with said manual shaft being rotated from one of said rotation permitting position and said parking lock position to the other.

4. The engine-starting device according claim 1, wherein the vehicle further has an oil pump configured to deliver a working oil used by said transmission, and said oil pump has an input shaft connected to an output member or a rotor shaft of said electric motor, and is operated by said output member or said rotor shaft.

5. An engine-starting device for a vehicle having an engine, an automatic transmission, and an oil pump configured to deliver a working oil used by said automatic transmission, the engine starting device being provided with a drive plate connected to a crankshaft of an engine, an electric motor having an output member provided, in one end portion thereof, with a pinion selectively engageable with the drive plate, and an actuator device configured to move said pinion to an engaging position for engagement with said drive plate to start said engine,
wherein said oil pump has an input shaft which is connected to said electric motor and which is rotated by said electric motor, and
wherein said input shaft of said oil pump is driven by said electric motor equally irrespective of whether or not said pinion is engaged with said drive plate.

6. The engine-starting device according to claim 5,
wherein said electric motor has a rotor shaft, such that said output member is connected to said rotor shaft via a speed reducer, so as to be rotated at a speed lower than a speed at which said rotor shaft is to be rotated,
wherein said input shaft of said oil pump and said rotor shaft are connected to each other and are non-rotatable relative to each other, and
wherein said pinion is connected to said output member.

* * * * *